US007788164B2

(12) United States Patent
Jain et al.

(10) Patent No.: US 7,788,164 B2
(45) Date of Patent: Aug. 31, 2010

(54) TRUTH REVEALING MARKET EQUILIBRIUM

(75) Inventors: Kamal Jain, Bellevue, WA (US); Kunal Talwar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 11/227,454

(22) Filed: Sep. 15, 2005

(65) Prior Publication Data

US 2007/0061240 A1    Mar. 15, 2007

(51) Int. Cl.
*G06Q 40/00* (2006.01)
(52) U.S. Cl. .................. 705/37; 705/14.49; 705/14.69; 705/14.73; 705/35
(58) Field of Classification Search .................. 705/37, 705/14, 10, 36
See application file for complete search history.

(56) References Cited

U.S. PATENT DOCUMENTS

| | | | | |
|---|---|---|---|---|
| 5,835,896 | A * | 11/1998 | Fisher et al. | 705/37 |
| 6,324,519 | B1 * | 11/2001 | Eldering | 705/14.66 |
| 7,043,450 | B2 * | 5/2006 | Velez et al. | 705/37 |
| 7,409,360 | B1 * | 8/2008 | Lark et al. | 705/26 |
| 7,702,318 | B2 * | 4/2010 | Ramer et al. | 455/414.2 |
| 2002/0046099 | A1 * | 4/2002 | Frengut et al. | 705/14 |
| 2002/0116313 | A1 * | 8/2002 | Detering | 705/37 |
| 2003/0033292 | A1 * | 2/2003 | Meisel et al. | 707/3 |
| 2004/0093296 | A1 * | 5/2004 | Phelan et al. | 705/36 |
| 2005/0144065 | A1 * | 6/2005 | Calabria et al. | 705/14 |
| 2006/0122879 | A1 * | 6/2006 | O'Kelley | 705/14 |
| 2006/0136320 | A1 * | 6/2006 | Saberi et al. | 705/37 |
| 2006/0167784 | A1 * | 7/2006 | Hoffberg | 705/37 |
| 2006/0277135 | A1 * | 12/2006 | Jain et al. | 705/37 |

FOREIGN PATENT DOCUMENTS

| | | | |
|---|---|---|---|
| KR | 20020000994 | | 1/2002 |
| WO | WO 94/10637 | * | 5/1994 |
| WO | WO0155923 | | 8/2001 |
| WO | WO2005019986 | | 3/2005 |

(Continued)

OTHER PUBLICATIONS

Brainard et al: "How to Compute Equilibrium Prices in 1891", No. 1272, Cowles Foundation Discussion Papers from Cowles Foundation, Yale University, Aug. 11, 2000.*

(Continued)

*Primary Examiner*—Narayanswamy Subramanian
*Assistant Examiner*—Ed Baird
(74) *Attorney, Agent, or Firm*—Lee & Hayes, PLLC

(57) ABSTRACT

To use market clearing methods to determine market equilibrium, a market clearing situation is established by determining a number of items to be sold at the market price and allotting a number of pseudo items assignable to bids below the market price. Once bids are received for the items, using the number of pseudo items and the actual items as the supply side, and the total funds bid as the demand side, a market clearing price is determinable using a market clearing equilibrium model. Funds assigned to pseudo items are returned or not charged. Further, by selling items only to bids exceeding the market clearing price, such as by setting the market price incrementally above the market clearing price, bidders are encouraged to submit bid prices bid reflecting what the items are worth to them instead of attempting to bid strategically to guess or set the market price.

8 Claims, 7 Drawing Sheets

FOREIGN PATENT DOCUMENTS

WO     WO2005086728     9/2005

OTHER PUBLICATIONS

Katok et al: "Auctions of Homogeneous Goods with Increasing Returns: Experimental Comparison of Alternative "Dutch" Auctions", Management Science. Linthicum: Aug. 2004. vol. 50, Iss. 8; p. 1044.*

Bapna et al: "Pricing and Allocation for Quality-Differentiated Online Services", Management Science. Linthicum: Jul. 2005. vol. 51, Iss. 7; p. 1141 (10 pages).*

PCT International Search Report and Written Opinion for Application No. PCT/US2006/036134 mailed on Feb. 6, 2007, pp. 1-10.

* cited by examiner

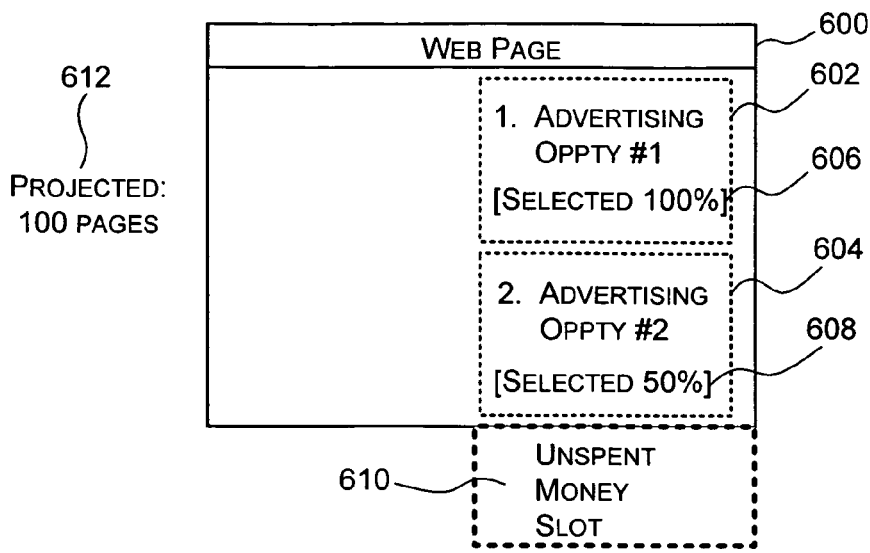
FIGURE 6
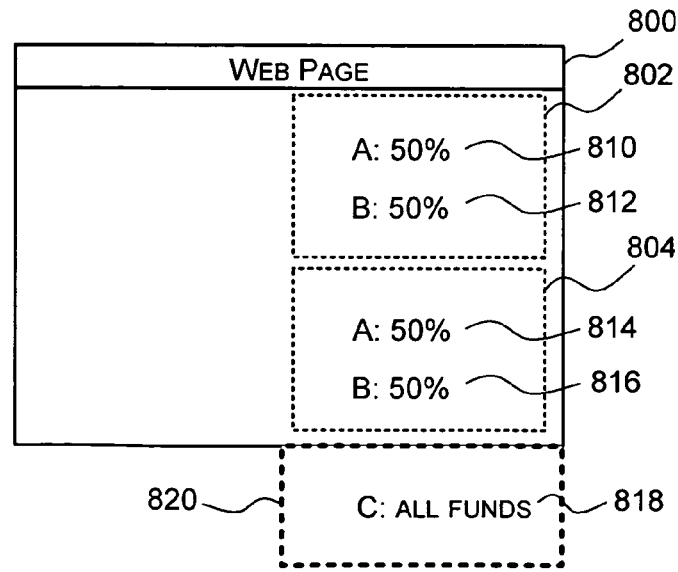
FIGURE 7
FIGURE 8

| Bidder | | Bid Price | | Auction Budget | |
|---|---|---|---|---|---|
| A | 910 | $2.00 | 912 | $75.00 | 914 |
| B | 920 | $1.00 | 922 | $75.00 | 924 |
| C | 930 | $0.50 | 932 | $10.00 | 934 |

TRUTH REVEALING MARKET EQUILIBRIUM

BACKGROUND

It is a basic axiom of microeconomic theory that the ideal market price for a good or service should be set at the market equilibrium point where demand is equal to supply. Unfortunately, just as microeconomic theory is difficult to apply in most real world situations, determining a market price based on market equilibrium point presents a difficult problem.

One example of a difficult case for determining an appropriate market price based on market equilibrium data is the sale of Internet advertising opportunities. Internet search engines, web-based mail, on-line reference sources, television programming guides, and providers of similar services earn revenue by presenting selectable advertisements over networks. The ads may be directed to any persons who might use the service, or the ads may be targeted to those whose on-line activities indicate interest in a particular type of good or service.

For example, FIG. 1 shows a search engine web page 100 that allows a person to perform a web search. To initiate the search, the person enters a search 102, consisting of one or more search terms, in a search field 104. The person then selects or "clicks" on a search button 106 by directing a pointing device (not shown) to position a cursor 108 over the search button 104 and pressing a button on the pointing device. In this example, the user performs a search 102 consisting of the term "Camera."

As shown in FIG. 2, the search engine returns a results screen 200 listing links 202 to web pages relevant to the search 102. The links 202 are presented and ranked according to their relevance to the search 102. In addition to the links 202, the results screen 200 also includes a number of sponsored links 204-208. The sponsored links 204-208 represent links to sellers or goods of services related to cameras. Unlike the links 202 that are presented because of their particular relevance to the search 102, the sponsored links 204-208 are presented because advertisers paid for the links to be presented. In addition to sponsored links, the provider of the search engine also may present banner ads (not shown) across the search screen 100 (FIG. 1) and the results screen 200, as well as pop-up ads that are presented in separate windows presented over the screens 100 and 200.

If the user wants to learn more about or purchase what is described in one of the sponsored links 204-208, the user positions a cursor 210 over the link and selects it. The likelihood of the user selecting an ad increases if the ad concerns a good or service of interest to the user. Thus, it is not a coincidence that the results screen 200 for the user's search 102 on the term "Camera" presented sponsored links 204-208 representing advertisers who deal in goods or services pertaining to cameras. An advertiser arranges with service providers for its ads to be presented when a user shows an interest in the advertiser's business by, for example, performing a search including one or more search terms relevant to its business. In this case, the sponsored links 204-208 are sold to advertisers who have paid to have their links presented when the word "camera" is used within a search 102. Advertisers agree to pay the search engine provider either each time one of the advertiser's ads either is presented, or each time one of the advertiser's ads is selected or "clicked" by a user.

Typically, the advertising opportunities, such as the sponsored links 204-208, are sold to advertisers by auction. Advertisers submit bids for advertising opportunities that arise, for example, when a user performs a search including one or more terms describing the advertiser's business. The advertisers' bids include a bid price and an auction budget. The bid price specifies a maximum price an advertiser is willing to pay for an advertising opportunity, and the auction budget specifies a total sum of money the advertiser is willing to spend on ads in a particular auction.

In the case of a results page 200 including multiple advertising opportunities in the form of sponsored links 204-208, multiple advertising opportunities are auctioned for each results page. Within the list of sponsored links 204-208, links listed higher in the list are more likely to be selected. Thus, the advertiser offering the highest bidder for the search term "camera" will win the advertising opportunity of sponsored link 204, a next highest bidder will win the advertising opportunity of sponsored link 206, and a third highest bidder will win the advertising opportunity of sponsored link 208. Other lower bidders will not win advertising opportunities.

Auctioning advertising opportunities according to such conventional means may lead to a number of undesirable results for advertisers. First, an advertiser who presents the highest bid may quickly win enough advertising opportunities to deplete its auction budget. However, if the advertiser's budget is completely depleted, the advertiser may be troubled that its offer was too high, particularly if the return on its advertising campaign falls short of its expectations. Second, conversely, an advertiser who presents a relatively low bid but a large budget may not win any advertising opportunities early in the auction period. Once other advertisers' auction budgets are depleted, the advertiser may win all the available advertising opportunities at the end of the auction period. However, the low-bidding advertiser may be very dissatisfied at having failed to win advertising opportunities until the end of the auction period.

In both of these cases, the advertisers may be dissatisfied and, as a result, may change their bidding practices. The high-bidding advertiser may bid lower, hoping to stretch its auction budget and win a larger number of advertisements. However, if the previous high bidder bids too low, it may win few or no advertising opportunities. On the other hand, the low-bidding advertiser may raise its bid, hoping to win advertising opportunities earlier in the auction. However, with the previous high bidder lowering its bid, the previous low bidder may find its auction budget depleted early during the course of the auction and become dissatisfied for the same reasons as the previous high bidder. Both advertisers may expend a great deal of time and money trying to determine how to bid, and still be disappointed with their results.

Understandably, the nature of the auction begets a certain amount of gamesmanship on the part of the advertisers. Because the prices of advertising opportunities sold via auction tend to be highly fluid, bidders may submit bids that are less than they are willing to pay in hopes of getting a bargain or, at least, testing the market to determine the minimum price that they might pay for advertising opportunities. In other words, the advertisers may not submit truthful bids representative of what the advertisers believe the advertising opportunities are worth. Instead, the bidders offer bids that are less than what the bidders believe the value of the advertising opportunities to be. These bids may fall below the market price and/or a reserve price set by the seller. If a bidder submits a bid price that falls below the selling price, the funds the bidder committed to the auction budget will be retained by the bidder.

Strategic bidding makes it a challenge for advertising providers to set market or reserve prices for advertising opportunities. Even if the supply of advertising opportunities is known, the actual demand for the advertising opportunities cannot be ascertained when bidders bid for those opportunities at levels below what those advertising opportunities are worth to them.

SUMMARY

To use market clearing methods to determine market equilibrium, a market clearing situation is established by determining a number of items to be sold at the market price and allotting a number of pseudo items assignable to bids below the market price. Once bids are received for the items, using the number of pseudo items and the actual items as the supply side, and using the total funds bid as the demand side, a market clearing price is determinable using a market clearing equilibrium model, such as a Fisher equilibrium model.

Funds assigned to pseudo items are returned to the bidder or are not charged. Further, by selling items only for bids exceeding the market clearing price, such as by setting the market price incrementally above the market clearing price, bidders are encouraged to submit bid prices bid reflecting what the items are worth to them instead of attempting to bid strategically to guess or set the market price.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number and the left-most two digits of a four-digit reference number identify the figure in which the reference number first appears. The use of the same reference numbers in different figures indicates similar or identical items.

FIG. 6 is a web page with which are associated advertising opportunities and an unspent money slot representing pseudo items to be assigned to bids below the market clearing price.

FIG. 7 is a set of bids submitted for the advertising opportunities.

FIG. 8 is a web page representing the results of the auction for the advertising opportunities based on the set of bids of FIG. 7.

DETAILED DESCRIPTION

Embodiments of methods and systems for determining market equilibria create a market clearing situation that enable the use of market clearing equilibrium models to calculate market equilibria and market prices. When a market is not cleared, such as when sellers do not sell all the items available for sale and/or the buyers do not spend all the monies they have committed to purchase items, determining market equilibria is very complicated. Generally, a Walras model, for which there are few available algorithms, must be used. Because of their complexity, Walras models are computationally intensive, and consume extensive computing resources.

Creating pseudo commodities that include a number of pseudo items that can be "sold" to bids below the market clearing price provides for a market clearing situation enabling the use of simpler market equilibrium calculations. The pseudo items are assigned to bidders for funds that, although allocated for the purchase of items, would not be spent. The funds assigned to pseudo items are not charged to the bidders or are returned to the bidders. Nonetheless, the sale of pseudo items clears the market, allowing the use of simpler market clearing models, such as Fisher equilibrium models, to compute market prices.

In addition, to discourage bidders from strategically bidding to test the market price, the market price may be set incrementally above the market clearing price, or items may not be assigned to market price bids. Because strategic bids will not win items, bidders will be encouraged to submit bids for items that reflect what the items are worth to those bidders rather than attempting to outguess the market.

Employing a Pseudo Commodity to Create a Market Clearing Scenario

Figure 1:
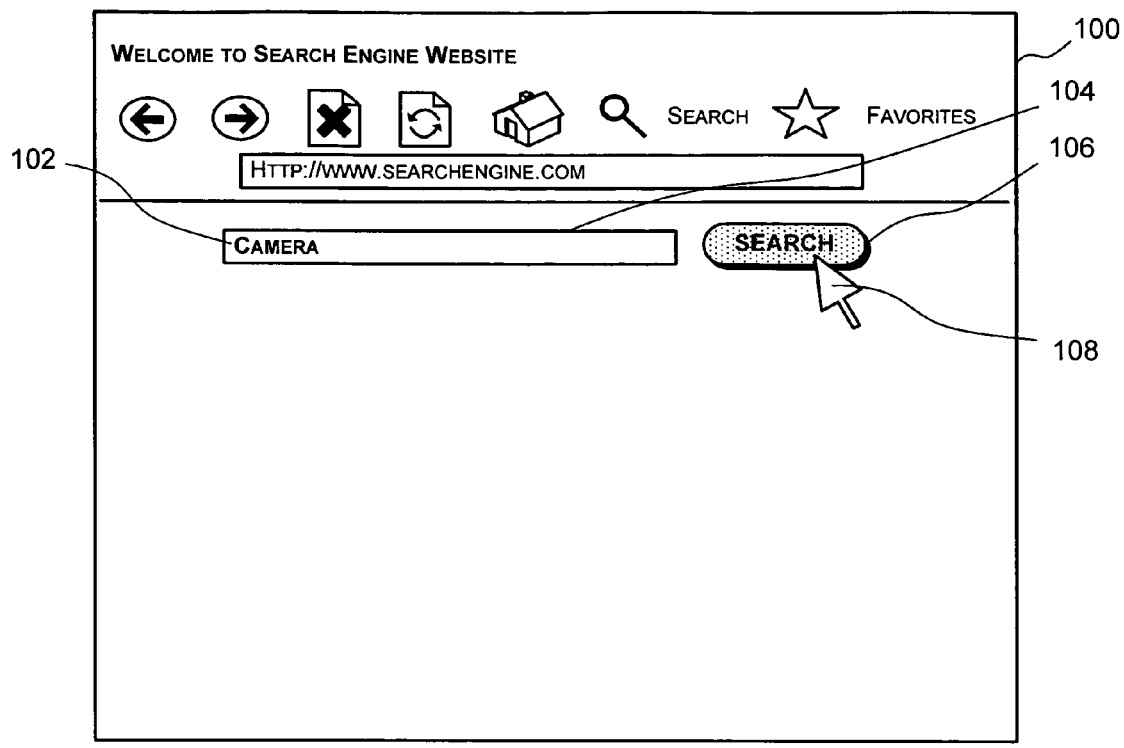
FIGS. 1 and 2 (Prior Art) are screens illustrating results of a search presenting a number of ads.
Figure 2:
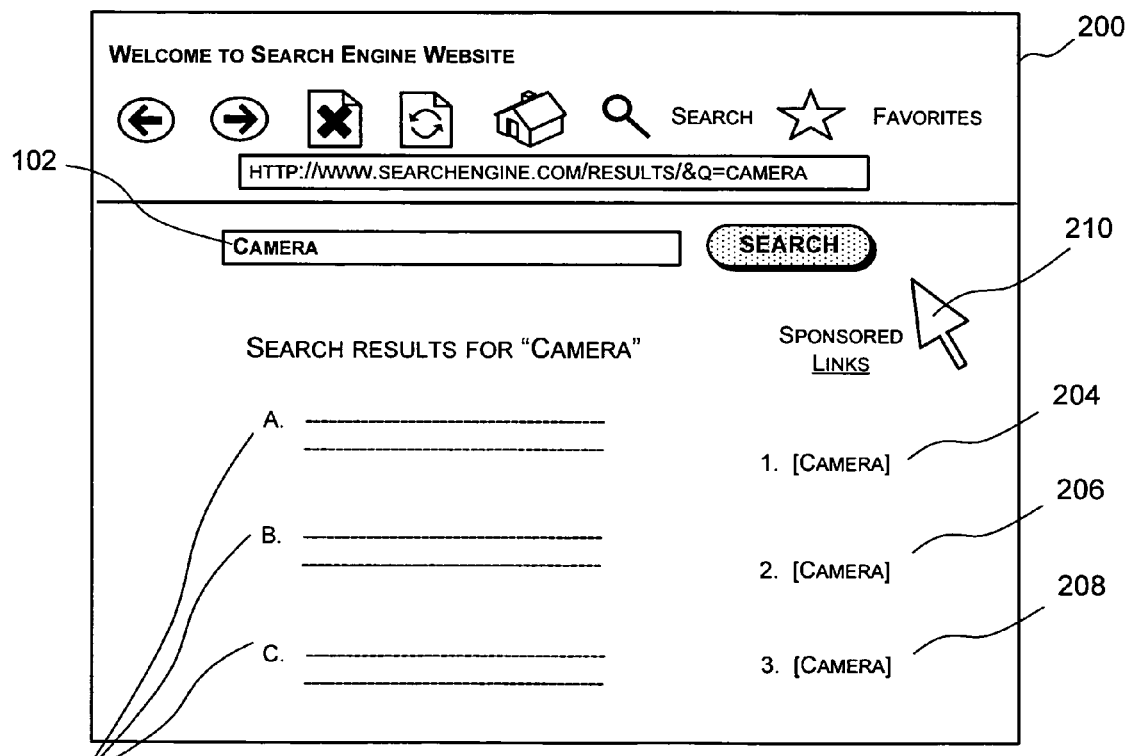
Figure 3:
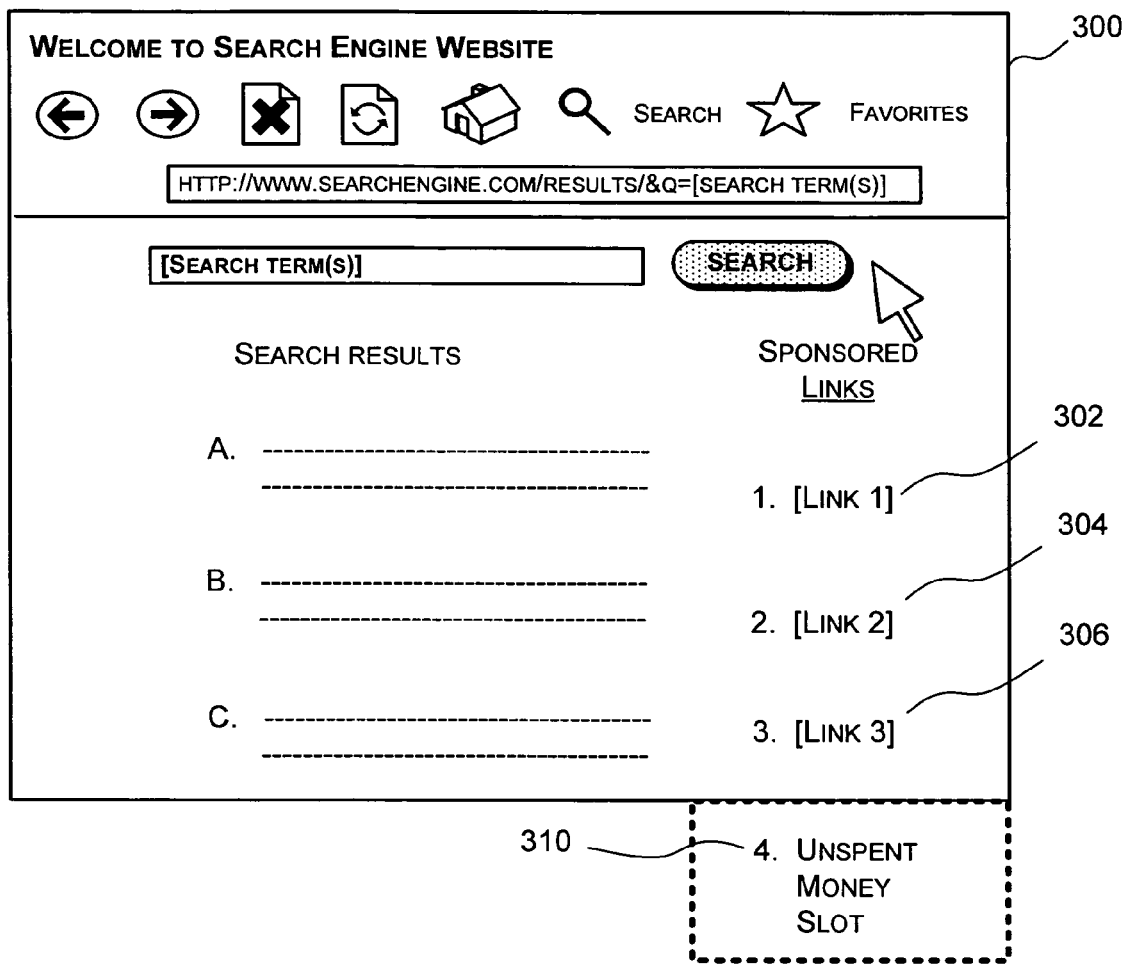
FIG. 3 is a screen representing available advertising opportunities and a logical representation of an unspent money slot.

FIG. 3 shows a screen 300 from an on-line service provider that sells advertising opportunities 302-306. As previously described, the three highest bidders for the advertising opportunities 302-306 will win the advertising opportunities 302-306, provided that the highest bidders continue to have sufficient funds in their auction budgets to pay for the advertising opportunities 302-306. Bidders whose bids are lower than those who win advertising opportunities 302-306, or whose bids are below a minimum or reserve price set by the provider of the advertising opportunity will not be charged.

As previously mentioned, in microeconomics, an appropriate market price can be determined from the market equilibrium point where supply equals demand. In the exemplary case of auctioning Internet advertising opportunities, the supply of advertising opportunities can be estimated with good accuracy. Using historical data, search engine providers and other providers of advertising opportunities can statistically estimate how many advertising opportunities they will have to sell. Search engine providers, in particular, can estimate how many searches are performed on certain days of the week, during certain months or seasons of the year based on historical, statistical data. Further, by knowing how many sponsored links or other advertising opportunities it can present on each search results screen, a search engine provider can accurately forecast its supply of advertising opportunities.

In a situation where bidders may not submit sufficiently high bids to purchase all the available advertising opportunities, some bidders will retain the funds committed to advertising opportunities. This is a non-market clearing situation. The market is not cleared because not all the advertising opportunities are sold and/or not all the advertising funds were spent.

In a non-market clearing situation, it is relatively difficult to determine a market equilibrium point. A Walras model, which is understood by economists, may be used to determine market equilibrium in a non-market clearing situation. However, application of a Walras model is very complicated. The Walras model treats all the participants in the auction as both buyers and sellers of items. Considering the case of bidders seeking to buy advertising opportunities from search engine providers, the bidders are both buyers of advertising opportunities and sellers of advertising dollars. The search engine providers, on the other hand, are buyers of advertising dollars and sellers of advertising opportunities. In this model where each participant is both a buyer and a seller, a market equilibrium point may be calculated in a non-market clearing situation.

However, as is also understood by economists, there are very few algorithms available for computing the market equilibrium point using a Walras model. Moreover, those models are highly computationally intensive and, therefore, consume substantial computing resources in determining a market equilibrium point.

On the other hand, market equilibrium is much easier to determine in a market clearing situation where a seller is able to sell all of its available supply of items, and the buyers spend all the funds they have allocated to acquiring those items. In a market clearing situation, a general Fisher equilibrium model can be used to determine market equilibrium. The Fisher model is simpler to calculate and, thus, much less computationally intensive. There are a large number of known algorithms that may be used to compute market equilibrium using a Fisher model.

A Fisher model is not applicable in non-market clearing situations, such as a case when bidders for advertising opportunities do not spend the funds they committed to advertising opportunities. However, in a mode of determining truth telling market equilibrium, a non-clearing market situation is adapted to simulate a market clearing situation, thus allowing for simple computation of market equilibrium using such model.

Referring to FIG. 3, in addition to the advertising opportunities represented by sponsored links 302-306 that are sold to bidders, a virtual unspent money slot 310 is added to which committed but unspent bidder funds are assigned. The unspent money slot 310 represents a pseudo item that neither actually is nor can be sold to bidders. When bidders' funds are assigned to the unspent money slot 310, those bidders' funds are, in effect, spent. In exchange, instead of selling advertising opportunities to the bidders whose funds are assigned to the unspent money slot 310, the seller sells these bidders an amount of money equal to their committed but unspent funds. Thus, using the unspent money slot, the seller sells all of its supply, including both available advertising opportunities 302-306, and monies assigned to the unspent money slot. The bidders similarly expend all their funds, either by buying advertising opportunities 302-306 or by spending their committed funds on the unspent money slot 310.

It is an artifice to add the unspent money slot 310 to the items being sold when monies assigned to the unspent money slot 310 are either returned to or never charged to the bidders. Nonetheless, use of the unspent money slot 310 facilitates computation of market equilibrium to allow the seller to set prices using a simple, market clearing situation model such as a Fisher equilibrium model.

Market Equilibrium Determination Process

Figure 4:
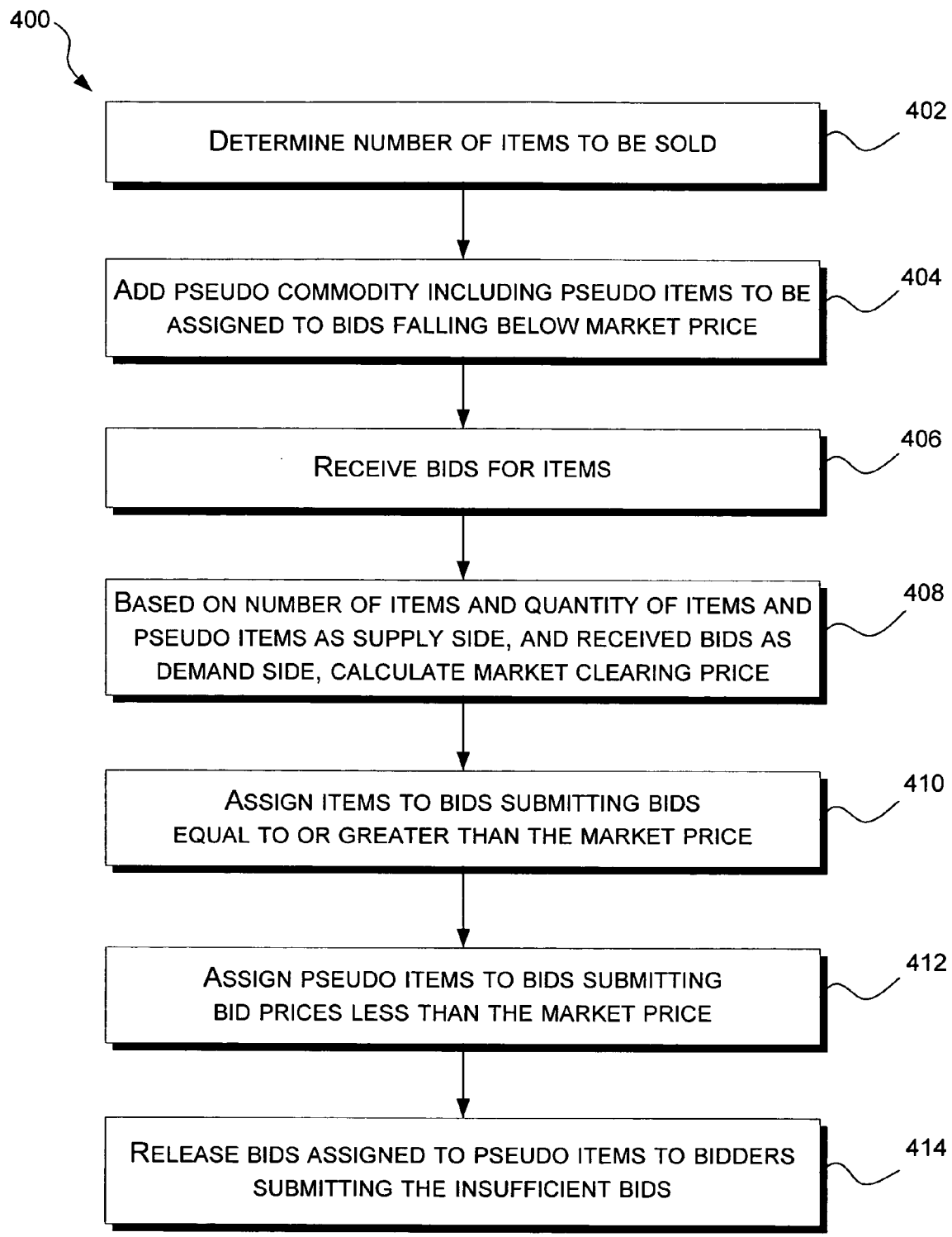
FIG. 4 is a flow diagram illustrating the logical steps of a process for determining a market equilibrium.

FIG. 4 is a flow diagram of one mode of a process 400 is used to determine market equilibrium. At 402, a number of items to be sold is determined. The number of items may be known, such as by determining a number of goods in inventory. Alternatively, the number of items may be estimated or projected.

At 404, a pseudo commodity is added that will be assigned to bids below market price. At 406, bids for the items to be sold are received. In the case of an auction for advertising opportunities or any auction where bidders may seek to acquire multiple goods, each bid includes a bid price and an auction budget. The bid price specifies the maximum price each bidder is willing to pay for a single item. The auction budget specifies a total sum the bidder is willing to spend on items to be sold during the auction.

At 408, an appropriate market price is determined. The market price is calculated with a supply side including the number of items to be sold and the number of pseudo items and a demand side including the received bids. The number of pseudo items needed to effect a market clearing situation is determinable from the number of items and the number of bids. The number of pseudo items included in the pseudo commodity is set so that the price of each pseudo item is equal to the price that will be paid for each pseudo item in a market clearing equilibrium. In one mode, a binary search algorithm is used to determine the appropriate number of pseudo items needed so that the price of each pseudo item is equivalent to the bid that will be assigned to each of the pseudo items.

With the appropriate number of pseudo items available to be assigned to each of the bids, a market clearing situation is created because the seller sells every item available for sale (including the needed number of pseudo items) and each buyer spends all of its available funds. The market clearing situation is simulated, because the pseudo items are not real items, and buyers' funds assigned to those items are either not charged to the buyers or are refunded to the buyers. Nonetheless, by creating the pseudo commodity and selling the pseudo items, a market clearing equilibrium model, such as a Fisher equilibrium model, can be used to determine market prices.

At 410, items are assigned to bids submitting bids that meet or exceed the market price determined at 408. At 412, on the other hand, pseudo items are assigned to the remaining bids that do not meet the market price. At 414, the bids assigned to pseudo items at 414 are released to the bidder submitting them. If the funds assigned to the pseudo items were charged to the bidder, the funds are returned directly to the bidder or are restored to an account under the bidder's control. Alternatively, if the funds committed by the bidder were not charged to the bidder, those funds will not be collected from the bidder.

In sum, a mode of determining market equilibrium as exemplified in FIG. 4 simulates a market clearing situation. Thus, a market price can be determined much more simply using a Fisher equilibrium model or similar model than by using a Walras model or other model that would have to be used in a non-market clearing situation.

Market Equilibrium Determination in an Advertising Opportunity Auction

Figure 5:
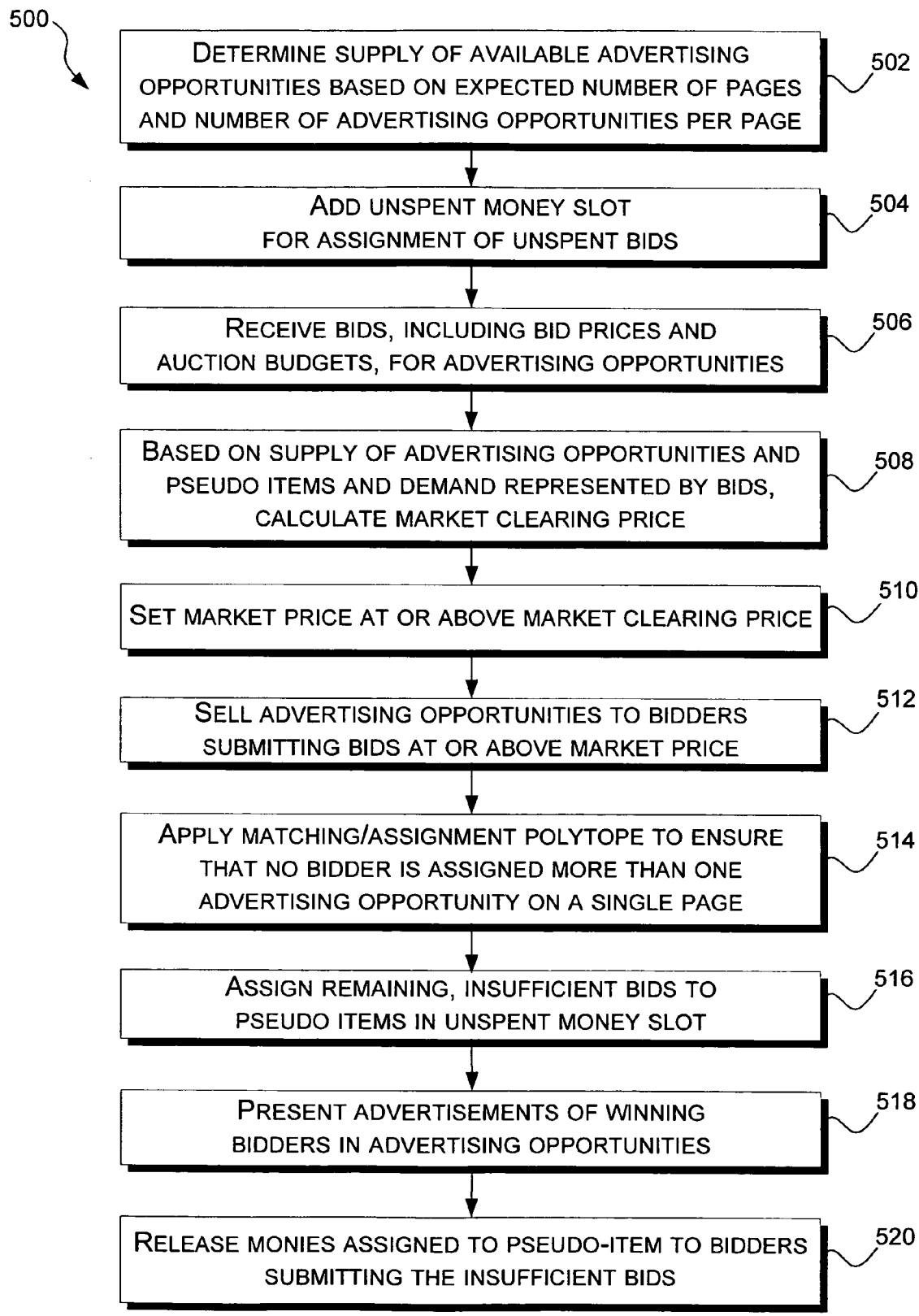
FIG. 5 is a flow diagram illustrating the logical steps of a process for determining a truth telling market equilibrium in the auctioning of advertising opportunities.

FIG. 5 is a flow diagram of one mode of a process 500 is used to determine market equilibrium in an auction of advertising opportunities. At 502, a number of available advertising opportunities to be sold is determined. An advertising provider can accurately estimate the number of available advertising opportunities expected to become available during a particular auction period. Considering the example of a search engine provider, the provider knows how many advertising spaces are available per page. Further, the provider can access historical data to determine how many searches have included the search terms in which advertisers will be interested. Providers who maintain records of searches conducted on particular days within particular months and/or seasons can project how many similar searches can be expected on a similar day in the future, and even at particular times on those days. Each of the searches will yield a results page including a known number of advertising opportunities. Thus, combining the number of searches with the known number of advertising opportunities associated with each search, an advertising provider can determine the number of advertising opportunities available to be auctioned or otherwise sold during a future period.

At 504, a pseudo commodity is added in the form of an unspent money slot 310 (FIG. 3). The unspent money slot 310, as is described further below, encompasses a number of pseudo advertising opportunities that will be assigned to each of the bids below the market price. At 506, bids for the advertising opportunities are received. In the case of an auction for advertising opportunities, each bid includes a bid price and an auction budget. The bid price specifies the maximum price each bidder is willing to pay for a single item. The auction budget specifies a total sum the bidder is willing to spend on items to be sold during the auction.

At 508, an appropriate market price is determined. The market price is calculated. In determining the market price, the supply side includes the number of advertising opportunities to be sold and the number of pseudo advertising opportunities included in the unspent money slot. The demand side is represented by the bid prices and the auction budgets within the received bids. The number of pseudo advertising opportunities needed to effect a market clearing situation is determinable from the number of advertising opportunities and the bids received as previously described.

At 510, in one mode of a facilitating a truth telling equilibrium, the market price is set at the market clearing price determined at 508, or the market price may be set slightly above the market clearing price. In a Vickery-type auction, for example, a second-highest bidder effectively sets the market price. When a bidder can set the market price, the auction is subject to undesirable gamesmanship and strategic bidding. It is desirable for bidders to bid what they believe the items on which they are bidding are worth. According to modes of market equilibrium determination, bidders are encouraged to bid what they believe items are worth because the bidders who submit a sufficient bid will win items, while others will not be charged. To enhance this result, bidders who bid exactly what is determined to be the market clearing price will not have items assigned to them. In other words, the market price is set just above the market clearing price.

Not assigning items to bidders that bid the market price encourages bidders to bid truthfully to what they believe the items are worth, rather than bidding at the level they believe to be the market price. Because bidding the market price will not win items for bidders making a market price bid, bidders are discouraged from attempting to strategically identify and bid the market price, but are encouraged to bid what they subjectively believe the items to be worth.

At 512, advertising opportunities are assigned to bids that meet or exceed the market price determined at 510. At 514, a matching polytype or assignment polytype is applied to ensure that the same bidder is not assigned more than one advertising opportunity on each page. A double stochastic matrix also may be used to prevent undesirable assignments of multiple advertising opportunities per page. At 516, the bids that were below the market price are assigned to pseudo items associated with the unspent money slot. Again, as previously described, a binary search algorithm or similar process is employed to ensure that there exist enough pseudo items to be assigned to below market price bids to effect a market clearing situation.

At 518, the advertisements associated with the bidders that have been assigned advertising opportunities are presented on web pages generated by the advertising provider. At 520, monies assigned pseudo items at 414 are released to the bidder submitting them. As previously described, if the funds assigned to the pseudo items were charged to the bidder, the funds are returned directly to the bidder or are restored to an account under the bidder's control. Alternatively, if the funds committed by the bidder were not charged to the bidder, those funds will not be collected from the bidder.

Determination of Market Clearing Price

As previously described, inclusion of pseudo items to which below market price bids are assigned facilitates calculation of the market price using a market clearing algorithm. Such a process is understood by those skilled in analysis and determination of market equilibria. Nonetheless, the nature of this determination is further described for sake of example.

In the case of auctioning advertising opportunities as previously described, it is projected that N web pages including advertising opportunities will be generated during the auction period, with each of the N web pages including k advertising opportunities. Each of the advertising opportunities is denoted by j for j=1 to k. Each of the k advertising opportunities, independent of a likelihood the advertisement inserted therein presents of being selected, has an inherent likelihood of being selected by a user of $\alpha_j$.

Bidding for the advertising opportunities are l bidders, each of which submits a bid of $b_i$ and an auction budget of $B_i$. The advertisements presented by each of the l bidders has an inherent likelihood of being selected, independent of the likelihood of the advertising opportunity in which the advertisement is presented of being selected, of $\beta_i$ for i=1 to l. Thus, the likelihood of an advertisement in a particular advertising opportunity being selected is $\alpha_j \beta_i$.

According to one exemplary mode, to facilitate determination of a market clearing equilibrium, an additional commodity is added to represent pseudo items, such as pseudo advertising opportunities in an unspent money slot. Thus, where there are k advertising opportunities for sale, the pseudo opportunity represents the (k+1)th item to be sold. To further facilitate the determination; (k+1) pseudo bidders are included in the market, each of which submits a bid price equal to the reserve price of the advertising opportunities and an auction budget equal to the product of the number of web pages N and the reserve price.

As a result, the utility for each of the bidders in winning one of the advertising opportunities is given by Eq. (1):

$$u_{ij} = b_i \alpha_j \beta_i \qquad (1)$$

The utility of each of the bidders to receive its money back by acquiring a pseudo item is given by Eq. (2):

$$u_{k+1} = 1 \qquad (2)$$

A constraint is added as represented by Eq. (3):

$$\sum_{j=1}^{k} x_{ij} \alpha_j \le L_i \qquad (3)$$

In Eq. (3), $x_{ij}$ represents a portion of each of the advertising opportunities j won by bidder i, and for each bidder $L_i$ is chosen such that $L_1 \geq L_2 \geq \ldots \geq L_l$, and $L_i \leq \alpha_i$ for $1 \leq i \leq \min(k, l)$, and $L_i=1$ for each of the pseudo bidders 1 through k+l. Using these equations, all the items are sold, all budgets are exhausted, and binary search or a similar algorithm is used to calculate a number of pseudo items needed for the price of each to be equal to 1. As a result, the market clearing equilibrium situation is solvable to determine the market clearing price.

However, as previously stated, using an additional commodity to represent the pseudo items and introducing a number of pseudo bidders, is only manner by which a market clearing equilibrium scenario may be determined. Other processes, such as those wherein a selection of $L_i$ will result in a matching polytype in which in matching polytope in which all the items are sold and all the budgets are exhausted, also are suitable for determining a market clearing equilibrium.

Examples of Determining Market Equilibria for Advertising Opportunities

FIGS. 6-10 are used to illustrate two examples of the determination of market clearing equilibria. Each of the equilibria is calculated in the exemplary context of auctioning advertising opportunities presentable on a web page 600. Specifically, web page 600 includes a first advertising opportunity 602 and a second advertising opportunity 604. For sake of example, it is assumed that the first advertising opportunity 602 has a likelihood of selection 606 of 100 percent such that, each time the web page 600 is presented, the first advertising opportunity 602 is always selected. The second advertising opportunity 604 has a likelihood of selection 608 of 50 percent such that the second advertising opportunity 604 is selected half the time the web page 600 is presented. An unspent money slot 610 is associated with the web page 600 to capture monies committed to the auction by bidders who submit bids that are less than the market price. Over the course of the auction period, based on historical and/or projected data, the web page 600 is estimated to be presented 100 times 612.

FIG. 7 shows a set of bids 700 offered by three bidders, Bidder A 710, Bidder B 720, and Bidder C 730. Bidder A 710 submits a bid price of $2.00 per selection 712 and an auction budget of $65.00 714. Bidder B 720 submits a bid price of $1.00 per selection 722 and an auction budget of $75.00 724. Bidder C 730 submits a bid price of $0.50 per selection 732 and an auction budget of $10.00 734.

In this three-bidder, two-item auction, the market clearing price is determinable by determining the aggregate supply and demand. In the 100 projected pages 612 (FIG. 6), the first advertising opportunity 602 is always selected for a total of 100 advertising opportunities resulting from the first advertising opportunity 602. The second advertising opportunity 604 is selected half of the times it is presented for an additional 50 advertising opportunities resulting from the second advertising opportunity 604. Thus, the total number of advertising opportunities representing the supply side is 150. The auction budgets of $65.00 414, $75.00 724, and $10.00 734 total $150 to determine the demand side. Accordingly, the market clearing price for each advertising opportunity is described by Eq. (4):

$$\text{Market clearing price} = \frac{\text{Total Demand}}{\text{Total Supply}} = \frac{\$140}{150} = \$0.93 \qquad (4)$$

Because Bidder A's bid 712 and Bidder B's bid 722 both exceed the market clearing price, Bidder A 710 and Bidder B 720 both will win items.

FIG. 8 shows a web page 800 graphically depicting the results of the auction. Using a matching or assignment polytope, the first advertising opportunity 802 will be assigned to Bidder A for 50 percent of its impressions 810 and to Bidder B for the other 50 percent of its impressions 812. Similarly, the second advertising opportunity 804 will be assigned to Bidder A for 50 percent of its impressions 814 and to Bidder B for the other 50 percent of its impressions 816. Because Bidder C's bid price 732 (FIG. 7) of $0.50 is below the market clearing price, all funds 818 of Bidder C's auction budget 734 is assigned to the unspent money slot 820. The market is cleared because all of the seller's advertising opportunities are sold and all the buyers have spent all the funds each has committed to the auction. Granted, Bidder C's auction budget 734 is spent on pseudo items in the unspent money slot 820 and those funds will be returned or never charged to Bidder C. Nonetheless, the artifice permits a market clearing algorithm to be used to calculate market clearing price.

Figures 9, 10:
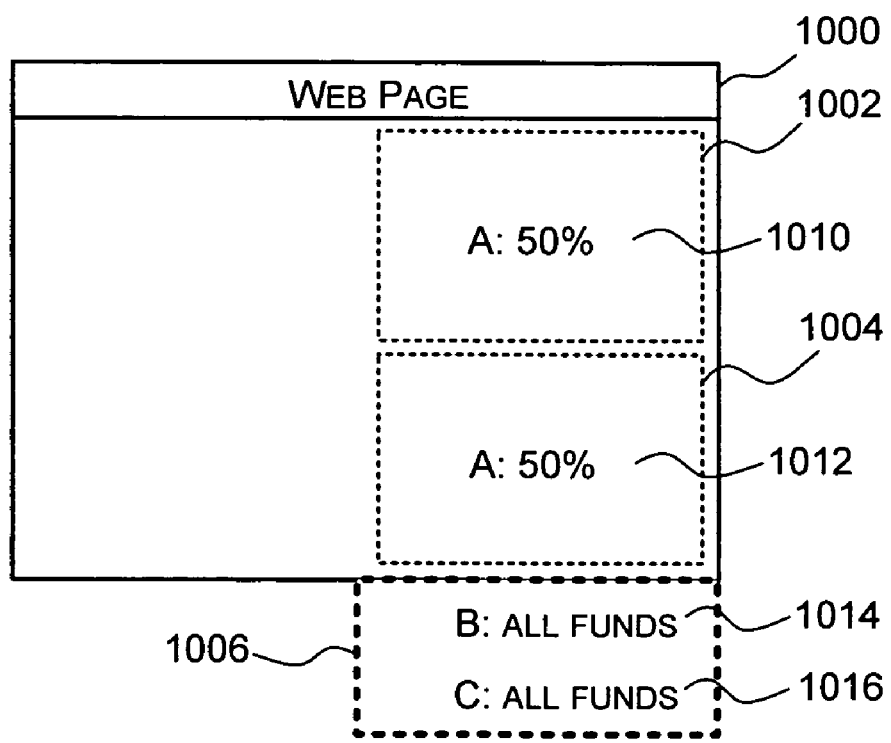
FIG. 9 is a second set of bids submitted for the advertising opportunities.
FIG. 10 is a web page representing the results of the auction for the advertising opportunities based on the set of bids of FIG. 9.

For a second example, FIG. 9 shows a second set of bids 900 offered by three bidders, Bidder A 910, Bidder B 920, and Bidder C 930. Bidder A 910 once again submits a bid price of $2.00 per selection 912, but this time submits an auction budget of $75.00 914. As in the example of FIG. 7, Bidder B 920 submits a bid price of $1.00 per selection 922 and an auction budget of $75.00 924, and Bidder C 930 submits a bid price of $0.50 per selection 932 and an auction budget of $10.00 934. The supply side is illustrated in FIG. 6 remains the same. By comparison with the example of FIG. 7, The total demand increases by $10 because Bidder A 910 increased its auction budget from $65.00 714 to $75.00 914. Thus, the market clearing price can be determined using Eq. (5):

$$\text{Market clearing price} = \frac{\text{Total Demand}}{\text{Total Supply}} = \frac{\$150}{150} = \$1.00 \qquad (5)$$

As previously described, in facilitating determination of a truth telling market equilibrium, it may be desirable to set the market price incrementally above the market clearing price to discourage bidders from attempting to strategically bid the market price. Thus, because Bidder B's bid 922 of $1.00 is at the market clearing price, Bidder B 920 will not be assigned advertising opportunities.

FIG. 10 shows a web page 1000 presenting the first advertising opportunity 1002, the second opportunity 1004, and an unspent money slot 1006. At a market price just over the market clearing price of $1.00 as determined in Eq. (5), on 50 percent 1010 of the presentations of the web page 1000, the first advertising opportunity 1002 is assigned to Bidder A, and on the other 50 percent 1012 of the presentations of the web page 1000, the second advertising opportunity 1004 is assigned to Bidder A. Thus, half of the total advertising opportunities remain unassigned. All funds 1014 of Bidder B's budget and all funds 1016 of Bidder C's budget are assigned to the unspent money slot 1006. In one mode of determining truth telling market equilibria, it is preferable to have unsold items, as shown in FIG. 10, rather than accept market price bids that may encourage strategic bidding or sway the market.

Computing System for Implementing Exemplary Embodiments

Figure 11:
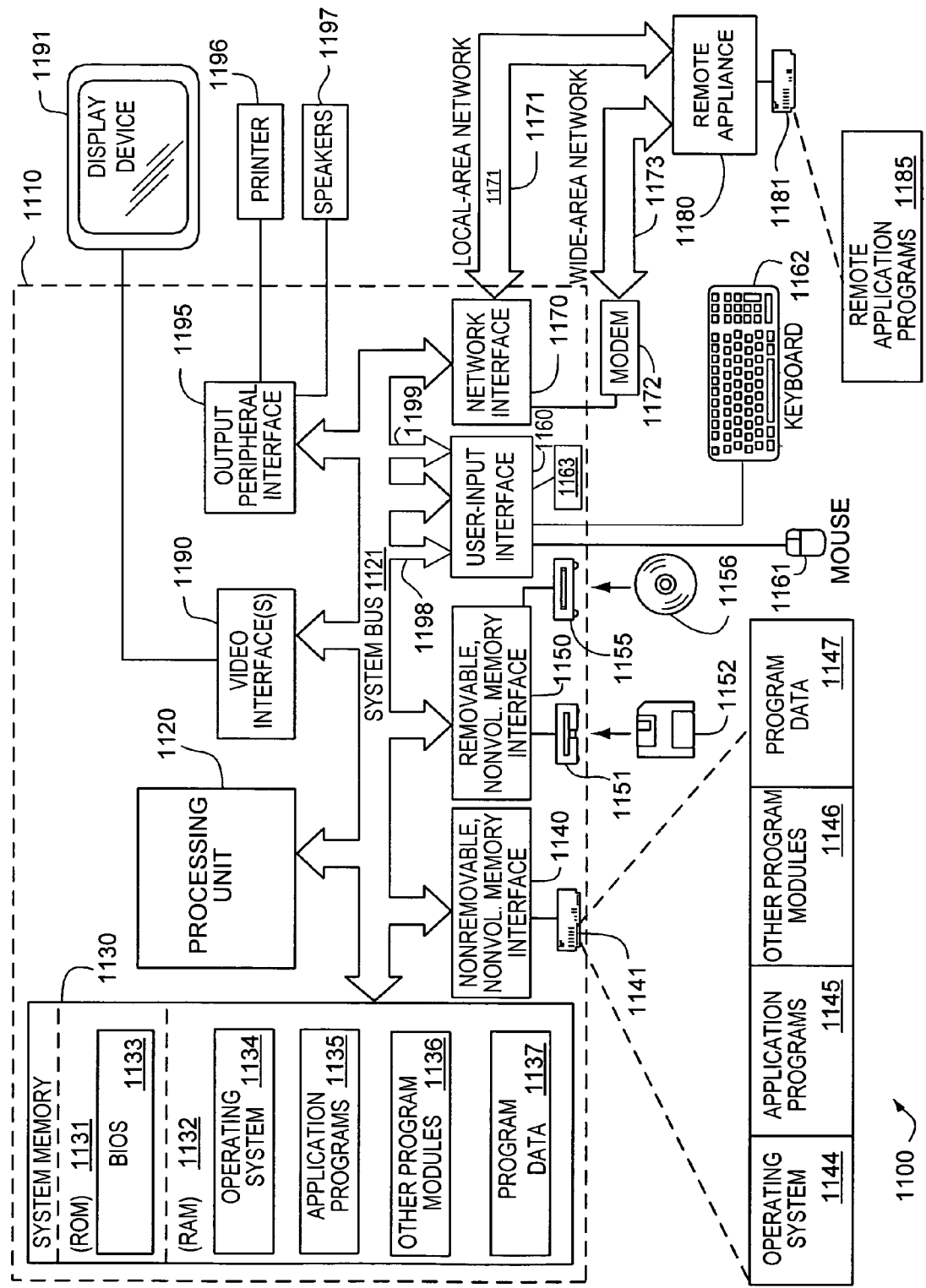
FIG. 11 is a block diagram of a computing-system environment suitable for use in determining a truth revealing market equilibrium.

FIG. 11 illustrates an exemplary computing system 1100 for implementing embodiments of the market equilibrium determination process illustrated by example in the foregoing description. The computing system 1100 is only one example of a suitable operating environment and is not intended to suggest any limitation as to the scope of use or functionality of exemplary embodiments of the market equilibrium determination process previously described or other embodiments. Neither should the computing system 1100 be interpreted as having any dependency or requirement relating to any one or combination of components illustrated in the exemplary computing system 1100.

The market equilibrium determination process may be described in the general context of computer-executable instructions, such as program modules, being executed on computing system 1100. Generally, program modules include routines, programs, objects, components, data structures, etc., that perform particular tasks or implement particular abstract data types. Moreover, those skilled in the art will appreciate that the market equilibrium determination process may be practiced with a variety of computer-system configurations, including hand-held devices, multiprocessor systems, microprocessor-based or programmable-consumer electronics, minicomputers, mainframe computers, and the like. The market equilibrium determination process may also be practiced in distributed-computing environments where tasks are performed by remote-processing devices that are linked through a communications network. In a distributed-computing environment, program modules may be located in both local and remote computer-storage media including memory-storage devices.

With reference to FIG. 11, an exemplary computing system 1100 for implementing the market equilibrium determination process includes a computer 1110 including a processing unit 1120, a system memory 1130, and a system bus 1121 that couples various system components including the system memory 1130 to the processing unit 1120.

Computer 1110 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1110. The system memory 1130 includes computer-storage media in the form of volatile and/or nonvolatile memory such as ROM 1131 and RAM 1132. A Basic Input/Output System 1133 (BIOS), containing the basic routines that help to transfer information between elements within computer 1110 (such as during start-up) is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/nonremovable, volatile/nonvolatile computer-storage media. By way of example only, FIG. 11 illustrates a hard disk drive 1141 that reads from or writes to nonremovable, nonvolatile magnetic media, a magnetic disk drive 1151 that reads from or writes to a removable, nonvolatile magnetic disk 1152, and an optical-disc drive 1155 that reads from or writes to a removable, nonvolatile optical disc 1156 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1141 is typically connected to the system bus 1121 through a nonremovable memory interface such as interface 1140. Magnetic disk drive 1151 and optical dick drive 1155 are typically connected to the system bus 1121 by a removable memory interface, such as interface 1150.

The drives and their associated computer-storage media discussed above and illustrated in FIG. 11 provide storage of computer-readable instructions, data structures, program modules and other data for computer 1110. For example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Typically, the operating system, application programs, and the like that are stored in RAM are portions of the corresponding systems, programs, or data read from hard disk drive 1141, the portions varying in size and scope depending on the functions desired. Operating system 1144, application programs 1145, other program modules 1146, and program data 1147 are given different numbers here to illustrate that, at a minimum, they can be different copies. A user may enter commands and information into the computer 1110 through input devices such as a keyboard 1162; pointing device 1161, commonly referred to as a mouse, trackball or touch pad; a wireless-input-reception component 1163; or a wireless source such as a remote control. Other input devices (not shown) may include a microphone, joystick, game pad, satellite dish, scanner, or the like. These and other input devices are often connected to the processing unit 1120 through a user-input interface 1160 that is coupled to the system bus 1121 but may be connected by other interface and bus structures, such as a parallel port, game port, IEEE 1394 port, or a universal serial bus (USB) 1198, or infrared (IR) bus 1199. As previously mentioned, input/output functions can be facilitated in a distributed manner via a communications network.

A display device 1191 is also connected to the system bus 1121 via an interface, such as a video interface 1190. Display device 1191 can be any device to display the output of computer 1110 not limited to a monitor, an LCD screen, a TFT screen, a flat-panel display, a conventional television, or screen projector. In addition to the display device 1191, computers may also include other peripheral output devices such as speakers 1197 and printer 1196, which may be connected through an output peripheral interface 1195.

The computer 1110 will operate in a networked environment using logical connections to one or more remote computers, such as a remote computer 1180. The remote computer 1180 may be a personal computer, and typically includes many or all of the elements described above relative to the computer 1110, although only a memory storage device 1181 has been illustrated in FIG. 11. The logical connections depicted in FIG. 11 include a local-area network (LAN) 1171 and a wide-area network (WAN) 1173 but may also include other networks, such as connections to a metropolitan-area network (MAN), intranet, or the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the network interface 1170, or other appropriate mechanism. Modem 1172 could be a cable modem, DSL modem, or other broadband device. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary, and other means of establishing a communications link between the computers may be used.

Although many other internal components of the computer 1110 are not shown, those of ordinary skill in the art will appreciate that such components and the interconnections are well-known. For example, including various expansion cards such as television-tuner cards and network-interface cards within a computer 1110 is conventional. Accordingly, additional details concerning the internal construction of the computer 1110 need not be disclosed in describing exemplary embodiments of the market equilibrium determination process.

When the computer 1110 is turned on or reset, the BIOS 1133, which is stored in ROM 1131, instructs the processing unit 1120 to load the operating system, or necessary portion thereof, from the hard disk drive 1141 into the RAM 1132. Once the copied portion of the operating system, designated as operating system 1144, is loaded into RAM 1132, the processing unit 1120 executes the operating system code and causes the visual elements associated with the user interface of the operating system 1134 to be displayed on the display device 1191. Typically, when an application program 1145 is opened by a user, the program code and relevant data are read from the hard disk drive 1141 and the necessary portions are copied into RAM 1132, the copied portion represented herein by reference numeral 1135.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A method using computer executable instructions, executable by a computing device for setting a market price for an auction of a number of advertising opportunities, each of the advertising opportunities being presentable on a number of pages and operable to present a selectable advertisement, the method comprising:
   setting, by the computing device, the market price for the auction of advertising opportunities based on supply and demand, the market price being calculated with a supply side including a number of items to be sold, and a number of pseudo items, and a demand side including received bids, wherein the pseudo items are not real items and neither actually are nor can be sold to bidders but are assignable to bids below the market price;
   determining, by the computing device, the number of advertising opportunities by using historical data from an online search engine provider, the online search engine provider to forecast a number of searches performed for search terms conducted on certain days, months or seasons of a year to yield results for a known number of advertising opportunities;
   creating, by the computing device, an unspent money slot;
   receiving, on the computing device, a plurality of bids for the advertising opportunities, each of the bids including a bid price and an auction budget;
   calculating, by the computing device, a market clearing price based on the number of advertising opportunities;
   setting, by the computing device, the market price to one of the market clearing price and a value greater than the market clearing price, or allowing a bidder to set the market price with a second highest bid;
   selling, by the computing device, advertising opportunities to the bidders submitting bids at or above the market price;
   assigning each of the number of advertising opportunities to each of the bids at least equivalent to the market price;
   presenting, by the computing device, on web pages that have been generated by the online service provider, advertisements associated with the bidders that have been assigned advertising opportunities; and
   refunding money in the unspent money slot.

2. A method of claim 1, wherein the number of advertising opportunities to be sold represents an estimated number of advertising opportunities derived from at least one of:
   a known number of advertising opportunities available to be sold;
   a body of historical data representing an actual number of advertising opportunities sold; and
   a projection of a number of advertising opportunities to be sold.

3. A method of claim 1, further comprising determining the number of pseudo items such that a price of each of the pseudo items is equivalent to each of the bids to which each of the pseudo items is assigned.

4. A method of claim 3, wherein the number of pseudo items is determined using a binary search algorithm.

5. A method of claim 1, wherein the plurality of bids includes:
   a plurality of actual bids received from a number of actual bidders; and
   a plurality of pseudo bids from a number of pseudo bidders wherein each of the pseudo bidders submits a bid price and an auction budget equal to a product of a reserve price and the number of rounds.

6. A method of claim 5, further comprising:
   determining a first likelihood of each of the advertising opportunities of being selected;
   determining a second likelihood of the advertisement being selected, independent of the advertising opportunity in which the selectable advertisement is presented, the second likelihood including:
      for each of the advertisements associated with actual bids, the second likelihood includes one of an estimated and a measured likelihood; and
      for each of the pseudo bids, the second likelihood is set to one; and
   the market clearing price is determined by maximizing a utility of each of the actual bidders and the pseudo bidders where the utility is the product of the bid price, the first likelihood, and the second likelihood.

7. A method of claim 6, further comprising ensuring that only a single advertisement for a single bidder is presented on a single screen using one of:
   a matching polytope is a selection of $L_i$ shown as a constraint comprising:

$$\sum_{j=1}^{k} x_{ij}\alpha_j \leq L_i$$

wherein $x_{ij}$ represents a portion of each of the advertising opportunities j won by the single bidder i, $\alpha_j$ represents an inherent likelihood of being selected by a user, and for each bidder $L_i$ is chosen such that $L_1 > L_2 > \ldots > L_l$, and $L_i < \alpha_i$ for $1 < i < \min(k, l)$, and $L_j = 1$ for each of pseudo bidders 1 through k+l, wherein using the equation in which items are sold and budgets are exhausted, the matching polytope is when all of the items are sold and all of the budgets are exhausted;

an assignment polytope includes assigning a first advertising opportunity to a first bidder for fifty percent and to a second bidder for fifty percent, wherein the assignment polytope is applied to ensure that the same bidder is not assigned more than one advertising opportunity on a page; and a double stochastic matrix includes a binary search algorithm employed to ensure that there are pseudo items to be assigned to below market price bids to effect a market clearing situation, wherein the double stochastic matrix is applied to ensure that the same bidder is not assigned more than one advertising opportunity on a page.

8. A method of claim 1, wherein the market clearing price is determined using a Fisher equilibrium model.

* * * * *